United States Patent
Chuang et al.

(10) Patent No.: US 10,123,008 B2
(45) Date of Patent: Nov. 6, 2018

(54) METHOD AND APPARATUS FOR CODING OF INTRA PREDICTION MODE

(75) Inventors: Tzu-Der Chuang, Hsinchu (TW); Ching-Yeh Chen, Taipei (TW); Yu-Wen Huang, Taipei (TW); Shan Liu, San Jose, CA (US); Zhi Zhou, San Jose, CA (US); Shaw-Min Lei, Hsinchu (TW)

(73) Assignee: HFI Innovation Inc., Zhubei (TW)

( * ) Notice: Subject to any disclaimer, the term of this patent is extended or adjusted under 35 U.S.C. 154(b) by 418 days.

(21) Appl. No.: 14/123,093

(22) PCT Filed: Jun. 14, 2012

(86) PCT No.: PCT/CN2012/076907
§ 371 (c)(1),
(2), (4) Date: Nov. 27, 2013

(87) PCT Pub. No.: WO2012/171463
PCT Pub. Date: Dec. 20, 2012

(65) Prior Publication Data
US 2014/0086323 A1 Mar. 27, 2014

Related U.S. Application Data

(60) Provisional application No. 61/498,259, filed on Jun. 17, 2011, provisional application No. 61/532,942, (Continued)

(51) Int. Cl.
*H04N 7/32* (2006.01)
*H04N 7/26* (2006.01)
(Continued)

(52) U.S. Cl.
CPC .......... *H04N 19/11* (2014.11); *H04N 19/136* (2014.11); *H04N 19/159* (2014.11);
(Continued)

(58) Field of Classification Search
CPC ....... H04N 19/70; H04N 19/11; H04N 19/159
(Continued)

(56) References Cited

U.S. PATENT DOCUMENTS 8,670,488 B2   3/2014   Anderson et al.
2008/0056355 A1   3/2008   Guo et al.
(Continued)

FOREIGN PATENT DOCUMENTS

CN   1656818   8/2005
CN   101888549   11/2010
(Continued)

OTHER PUBLICATIONS

Rehman, J.U., et al.; "Fast Intra Prediction Mode Decision by Adaptively Selecting Fewer Number of Modes;" Proceedings of the Sixth International Conference on Machine Learning and Cybernetics; Aug. 2007; pp. 2385-2389.
(Continued)

*Primary Examiner* — Jorge L Ortiz Criado
*Assistant Examiner* — Mainul Hasan
(74) *Attorney, Agent, or Firm* — Wolf, Greenfield & Sacks, P.C.

(57) ABSTRACT

Embodiments according to the present invention configure the intra prediction mode candidates into multi-level MPM sets, which comprise at least a first-level MPM set and a second-level MPM set. Encoding or decoding a current intra prediction mode is based on the multi-level MPM sets, where one syntax element of the syntax information to be generated or decoded respectively is associated with evaluating the current intra prediction mode using the first-level MPM set. A method and apparatus for chroma intra prediction mode encoding and decoding are also disclosed. The chroma intra prediction mode set includes a Luma-based chroma prediction Mode (LM), a Direct Mode (DM) and
(Continued)

four other modes. The codeword set comprises variable-length codewords and fixed-length codewords, and the fixed-length codewords are longer than the variable-length codewords. The variable-length codewords are used for the DM and LM, and the fixed-length codewords are used for the four other modes.

25 Claims, 12 Drawing Sheets

Related U.S. Application Data filed on Sep. 9, 2011, provisional application No. 61/532,955, filed on Sep. 9, 2011.

(51) Int. Cl.
*H04N 19/11* (2014.01)
*H04N 19/159* (2014.01)
*H04N 19/176* (2014.01)
*H04N 19/70* (2014.01)
*H04N 19/593* (2014.01)
*H04N 19/463* (2014.01)
*H04N 19/186* (2014.01)
*H04N 19/136* (2014.01)
*H04N 19/169* (2014.01)
*H04N 19/44* (2014.01)
*H04N 19/91* (2014.01)

(52) U.S. Cl.
CPC ......... *H04N 19/176* (2014.11); *H04N 19/186* (2014.11); *H04N 19/1887* (2014.11); *H04N 19/44* (2014.11); *H04N 19/463* (2014.11); *H04N 19/593* (2014.11); *H04N 19/70* (2014.11); *H04N 19/91* (2014.11)

(58) Field of Classification Search
USPC .................................................. 375/240.12
See application file for complete search history.

(56) References Cited

U.S. PATENT DOCUMENTS

| | | |
|---|---|---|
| 2010/0054616 A1 | 3/2010 | Kim |
| 2011/0255591 A1 | 10/2011 | Kim et al. |
| 2012/0183054 A1 | 7/2012 | Maani et al. |
| 2012/0183064 A1* | 7/2012 | Liu .................. H04N 19/00569 375/240.13 |
| 2012/0314766 A1* | 12/2012 | Chien .................. H04N 19/176 375/240.12 |
| 2012/0328009 A1* | 12/2012 | Sasai .................... H04N 19/197 375/240.12 |
| 2016/0044318 A1 | 2/2016 | Sun et al. |

FOREIGN PATENT DOCUMENTS

| | | |
|---|---|---|
| CN | 101888549 A | 11/2010 |
| CN | 101895761 A | 11/2010 |
| CN | 101971631 | 2/2011 |
| EP | 1 711 018 | 10/2006 |
| KR | 100739714 | 7/2007 |
| WO | 2009/080133 A1 | 7/2009 |

OTHER PUBLICATIONS

Guillo, L., et al.; "Intra Prediction by a Linear Combination of Template Matching Predictors;" Joint Collaborative Team on Video Coding (JCT-VC) of ITU-T SG16 WP3 and ISO/IEC JTC/SC29/WG11; Jul. 2010; pp. 1-9.

Chuang, T.D, et al.; "•Luma Intra Prediction Mode Coding;" Joint Collaborative Team on Video Coding (JCT-VC) of ITU-T SG16 WP3 and ISO/IEC JTC/SC29/WG11; Jul. 2011; pp. 1-5.

Yamamoto, T., et al.; "Flexible Representation of Intra Prediction Modes;" Joint Collaborative Team on Video Coding (JCT-VC) of ITU-T SG16 WP3 and ISO/IEC JTC/SC29/WG11; Jul. 2010; pp. 1-7.

\* cited by examiner

METHOD AND APPARATUS FOR CODING OF INTRA PREDICTION MODE

CROSS REFERENCE TO RELATED APPLICATIONS

This Application is a national stage filing under 35 U.S.C. § 371 of International Patent Application Serial No. PCT/CN2012/076907, filed Jun. 14, 2012, entitled "METHOD AND APPARATUS FOR CODING OF INTRA PREDICTION MODE", which claims the benefit under 35 U.S.C. § 119(e) of U.S. Provisional Patent Application, Ser. No. 61/498,259, filed Jun. 17, 2011, entitled "Intra Prediction Mode Coding Method", U.S. Provisional Patent Application, Ser. No. 61/532,955, filed Sep. 9, 2011, entitled "Intra Prediction Mode Coding Method", and U.S. Provisional Patent Application, Ser. No. 61/532,942, filed Sep. 9, 2011, entitled "Method and Apparatus for Intra Chroma Mode in HEVC". The U.S. Provisional Patent Applications are hereby incorporated by reference in their entireties.

FIELD OF INVENTION

The present invention relates to video coding. In particular, the present invention relates to coding techniques associated with the intra luma and chroma prediction mode.

BACKGROUND OF THE INVENTION

Motion compensated inter-frame coding has been widely adopted in various coding standards, such as MPEG-1/2/4 and H.261/H.263/H.264/AVC. While motion-compensated inter-frame coding can effectively reduce bitrate for compressed video, intra mode coding is still required to process an initial picture or to periodically insert I-pictures (or Intra-coded picture, I-picture), and the I-pictures are inserted periodically to allow quick access to the compressed video data or to alleviate error propagation. Intra prediction exploits the spatial correlation within a picture or within a picture region. In order to further improve coding efficiency, the High-Efficiency Video Coding (HEVC) standard being developed exploits block-based spatial prediction extensively. In HEVC, multiple intra prediction modes are used to exploit spatial features and the number of intra prediction modes depends on the block size of a Prediction Unit (PU). The size of PU for intra coding can be 64×64, 32×32, 16×16, 8×8, or 4×4. The number of intra prediction modes can be as many as 35, including 33 directional prediction modes, one DC mode and one Planar mode as shown in FIG. 1. In HEVC, the number of luma intra prediction modes depends on the PU size as shown in Table. 1. For PU size 4×4 or 64×64, only a subset of the 35 luma intra prediction modes is used. In order for a decoder to operate according to the luma intra prediction mode selected by the encoder, the luma intra prediction mode information has to be incorporated in the bitstream. The side information associated with the luma intra prediction mode may be substantial and therefore, it is desirable to develop schemes to improve the efficiency for coding luma intra prediction mode.

TABLE 1

| Block size | Number of Luma Mode | Luma Modes |
|---|---|---|
| 64 × 64 | 4 | 0~3 |
| 32 × 32 | 35 | 0~34 |
| 16 × 16 | 35 | 0~34 |
| 8 × 8 | 35 | 0~34 |
| 4 × 4 | 18 | 0~17 |

In the current HEVC, a luma intra prediction mode is coded for each PU in a predictive manner based on neighboring PUs. FIG. 2 shows the configuration of neighboring PUs for predictive coding of the luma intra prediction mode adopted by the current HEVC. When the intra prediction mode of the current PU (ModeC) is coded, the mode of the left PU (ModeL) and the mode of the above PU (ModeA) are used to generate the most probable mode (MPM) for the current PU.

FIG. 3 illustrates an exemplary flow chart of predictive coding of the luma intra prediction mode according to the current HEVC. First, the luma intra prediction mode for the left block, ModeL and the luma intra prediction mode for the above block, ModeA are utilized to generate two MPMs, i.e., MPM0 and MPM1 as shown in step 310. A variable ModeC' is initialized to be ModeC. A test is performed in step 312 to determine whether ModeC is equal to MPM0 or MPM1. If ModeA is not equal to ModeL, MPM0 and MPM1 are set to min(ModeL, ModeA) and max(ModeL, ModeA), respectively. If ModeA is equal to ModeL, MPM0 is set to ModeL, MPM1 is equal to 0 or 3, where if ModeL is not equal to 0, MPM1 is set to 0 and if ModeL is equal to 0, MPM1 is set to 3. If the test result in step 312 is "Yes", i.e., ModeC is equal to MPM0 or MPM1, prev_pred_mode_flag is set to 1 and mpm_idx is utilized to indicate whether ModeC is equal to MPM0 or MPM1. A test is performed in step 314 to check if ModeC is equal to MPM0. Accordingly, mpm_idx is set to 0 if ModeC is equal to MPM0 and mpm_idx is set to 1 if ModeC is not equal to MPM0. The syntax elements prev_pred_mode_flag and mpm_idx are encoded in step 316.

If ModeC is not equal to MPM0 or MPM1, prev_pred_mode_flag is set to 0 and the syntax is encoded as shown in step 320. In this case, ModeC is equal to one of the remaining mode as indicated by rem_intra_luma_pred_mode. Steps 322 through 328 derive rem_intra_luma_pred_mode. The rem_intra_luma_pred_mode is then coded in step 330 using CABAC with fixed length binarization. ModeA or ModeL may not be directly applied when the neighboring PU and the current PU have different block sizes. In this case, ModeA or ModeL will be mapped to a value corresponding to a subset of the luma intra prediction modes. When ModeA or ModeL is unavailable, ModeA or ModeL is set to DC mode.

The probability distribution of remaining modes usually is not uniform. The fixed length binarization or coding for rem_intra_luma_pred_mode is not suitable due to poor coding efficiency. Therefore, it is also desirable to design a new coding method to indicate which the remaining mode is the current mode.

Intra prediction mode is also applied to the chroma components. Similar to luma intra prediction, intra prediction can be applied to chroma blocks (PUs) having size from 4×4 to 32×32. Since the luma component is usually processed before the chroma components, the chroma intra prediction may take advantage of coded luma information. Accordingly, the chroma intra prediction modes being considered by a current HEVC system utilize coded luma intra prediction mode as shown in Table 2.

TABLE 2

| intra_chroma_pred_mode | 0 (PL) | 1 (V) | 2 (H) | 3 (DC) | X (4 <= X < 35) |
|---|---|---|---|---|---|
| 0 (PL) | 7 (VER + 8) | 0 (PL) | 0 (PL) | 0 (PL) | 0 (PL) |
| 1 (V) | 1 (V) | 7 (VER + 8) | 1 (V) | 1 (V) | 1 (V) |
| 2 (H) | 2 (H) | 2 (H) | 7 (VER + 8) | 2 (H) | 2 (H) |
| 3 (DC) | 3 (DC) | 3 (DC) | 3 (DC) | 7 (VER + 8) | 3 (DC) |
| 35 (LM) | 35 (LM) | 35 (LM) | 35 (LM) | 35 (LM) | 35 (LM) |
| 36 (DM) | 0 (PL) | 1 (V) | 2 (H) | 3 (DC) | X |

IntraPredMode[xB] [yB] in Table 2 is the intra prediction mode previously derived for adjacent blocks of a corresponding block at (xB, yB). Luma-based chroma prediction Mode (LM) is the luma to chroma prediction mode where the reconstructed pixels of the luma block is used to predict the chroma intra prediction mode. DM represents Direct Mode where IntraPredMode[xB] [yB] is used directly as the chroma intra prediction mode. Besides LM and DM, four other modes are included in the chroma intra prediction mode set: Planar, Vertical, Horizontal and DC. When DM equals to any of these four modes, the mode corresponding to VER+8 is used to replace the redundant DM. VER+8 represents the intra prediction mode generated by rotating the Vertical mode clockwise by 8 positions. The six modes in the chroma prediction mode set are then coded with Exp-Golomb code as shown in Table 3.

TABLE 3

| intra_chroma_pred_mode | Codeword |
|---|---|
| 0 (Planar) | 110 |
| 1 (Vertical) | 1110 |
| 2 (Horizontal) | 11110 |
| 3 (DC) | 11111 |
| 35 (LM) | 10 |
| 36 (DM) | 0 |

Since the luma intra prediction mode derived from for adjacent blocks may be highly correlated to the chroma intra prediction mode, a shorted codeword "0" is assigned to the DM to achieve high coding efficiency. Codewords are assigned to the other five modes, including LM, Planer, Vertical, Horizontal, and DC modes, based on an estimated probability of occurrence, so that the more popular mode is assigned with a shorter codeword.

SUMMARY OF THE INVENTION

A method and apparatus for intra prediction mode encoding or decoding based on multi-level most probable mode (MPM) sets are disclosed. In various embodiments according to the present invention, the method and apparatus for encoding or decoding intra prediction mode configure multiple intra prediction mode candidates into multi-level MPM sets, wherein the multi-level MPM sets comprise at least a first-level MPM set and a second-level MPM set. Furthermore, decoding of a current intra prediction mode corresponding to a current block is performed according to the multi-level MPM sets, wherein one syntax element of the syntax information to be decoded is associated with evaluating the current intra prediction mode using the first-level MPM set. Encoding the current intra prediction mode is performed according to the multi-level MPM sets to generate syntax information, wherein one syntax element of the syntax information generated is associated with evaluating the current intra prediction mode using the first-level MPM set. The plurality of intra prediction mode candidates can be derived from any member or any combination of a group comprising intra prediction modes of neighboring blocks, coded intra prediction modes, derived intra prediction modes from the neighboring blocks, coded intra prediction modes with a rule, table look-up results according to the neighboring blocks, and coded intra prediction modes with a predefined fixed table or with an adaptive table.

In one embodiment according to the present invention, the syntax information includes a first MPM flag to indicate whether the current intra prediction mode is equal to any intra prediction mode candidate in the multi-level MPM sets. If the first MPM flag indicates that the current intra prediction mode is not equal to any intra prediction mode candidate in the multi-level MPM sets, the syntax information includes a remaining mode index. The syntax information may include a second MPM flag to indicate whether the current intra prediction mode is equal to any intra prediction mode candidate in first-level MPM set. If the second MPM flag indicates that the current intra prediction mode is equal to one intra prediction mode candidate in the first-level MPM set, decoding syntax information associated with MPM flags is stopped and, otherwise, decoding syntax information associated with a next MPM flag is performed until the syntax information indicating that the current intra prediction mode is equal to one intra prediction mode candidate in one of the multi-level MPM sets is found at a certain level or at a last level.

In another embodiment of the present invention, the syntax information includes the first MPM flag to indicate whether the current intra prediction mode is equal to any intra prediction mode candidate in first-level MPM set. If the first MPM flag indicates that the current intra prediction mode is equal to one intra prediction mode candidate in the first-level MPM set, decoding syntax information associated with MPM flags is stopped and, otherwise, decoding syntax information associated with a next MPM flag to indicate whether the current intra prediction mode is equal to one intra prediction mode candidate in next-level MPM set is performed until the syntax information indicating that the current intra prediction mode is equal to one intra prediction mode candidate in the current-level MPM set or until the MPM flag indicating whether the current intra prediction mode is equal to one intra prediction mode candidate in a last-level MPM set is decoded.

A method and apparatus for chroma intra prediction mode encoding and decoding are also disclosed. For chroma intra prediction mode decoding, the method decodes a chroma intra prediction mode for a current chroma block according to a codeword set corresponding to a chroma intra prediction mode set, wherein the codeword set comprises variable-length codewords and fixed-length codewords, and the fixed-length codewords are longer than the variable-length codewords. If the codeword is one of the variable-length codewords, the chroma intra prediction mode is decoded as a Luma-based chroma prediction Mode (LM) or a Direct Mode (DM). If the codeword is one of the fixed-length codewords, the chroma intra prediction mode is decoded as one of four modes other than the DM and the LM. For chroma intra prediction mode encoding, the method determines a chroma intra prediction mode set comprising a Luma-based chroma prediction Mode (LM), a Direct Mode (DM), and four other modes, wherein the LM derives the chroma intra prediction mode from reconstructed pixels of a current luma block, and the DM determines the chroma intra prediction mode based on an intra prediction mode of the current luma block. Then the chroma intra prediction mode for a current chroma block is encoded using a codeword set corresponding to the chroma intra prediction mode set, wherein the codeword set comprises variable-length codewords for the LM and the DM, and fixed-length codewords for said four other modes, and the fixed-length codewords are longer than the variable-length codewords.

DETAILED DESCRIPTION

In order to improve coding efficiency for intra prediction mode, a multi-level MPM coding method according to the present invention is disclosed. The method according to the present invention can be invoked when the encoder or decoder has to encode or decode intra prediction modes. Furthermore, multiple MPMs are selected based on intra modes of neighboring PUs. The MPMs are classified into different sets for different levels of MPM coding. The remaining modes that are not selected as MPMs can be coded by n-bit fixed length binarization or coding, where the n is an integer corresponding to the ceiling value of $\log_2$ (total number of remaining modes). Since the total number of remaining modes may not be equal to $2^n$, some n-bit code words become redundant. These redundant symbols can be skipped. Other coding methods may also be used to code the remaining modes that are not selected as MPMs.

Figure 1:
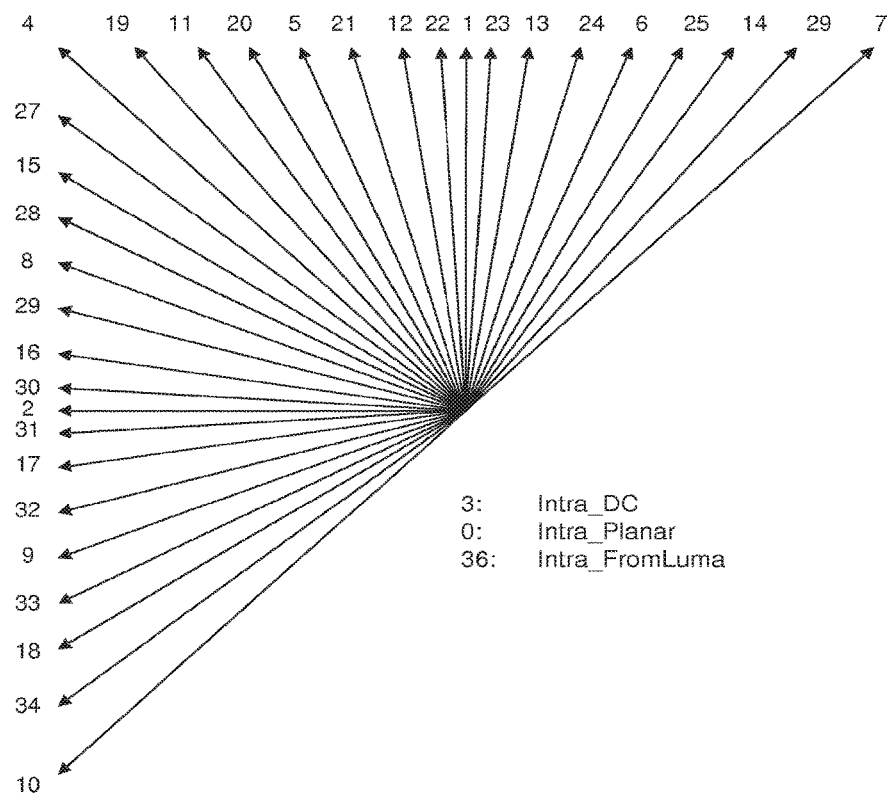
FIG. 1 illustrates the intra prediction being considered for High-Efficiency Video Coding (HEVC).
Figure 2:
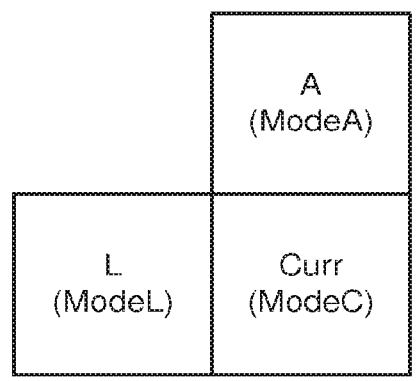
FIG. 2 illustrates an example of two neighboring blocks used for deriving intra prediction mode.
Figure 3:
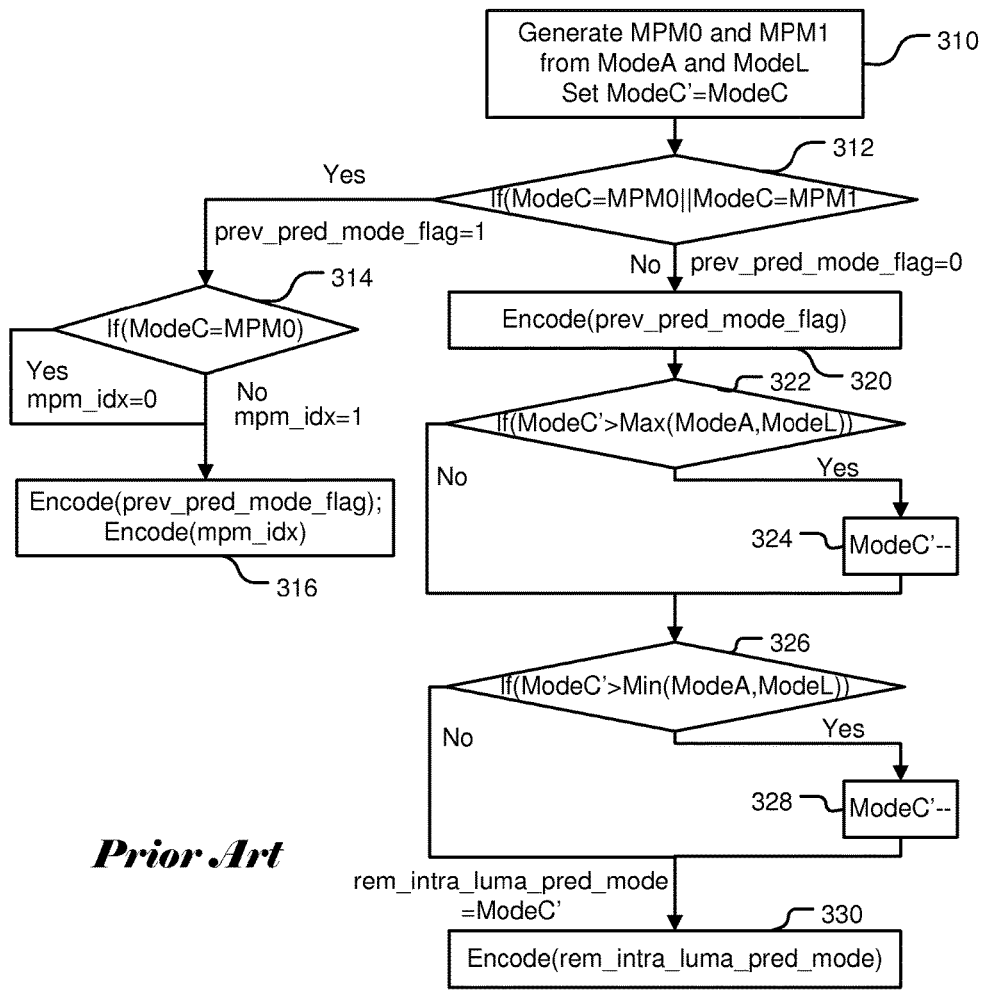
FIG. 3 illustrates a flow chart corresponding to coding the luma intra prediction mode according to a conventional approach.
Figure 4:
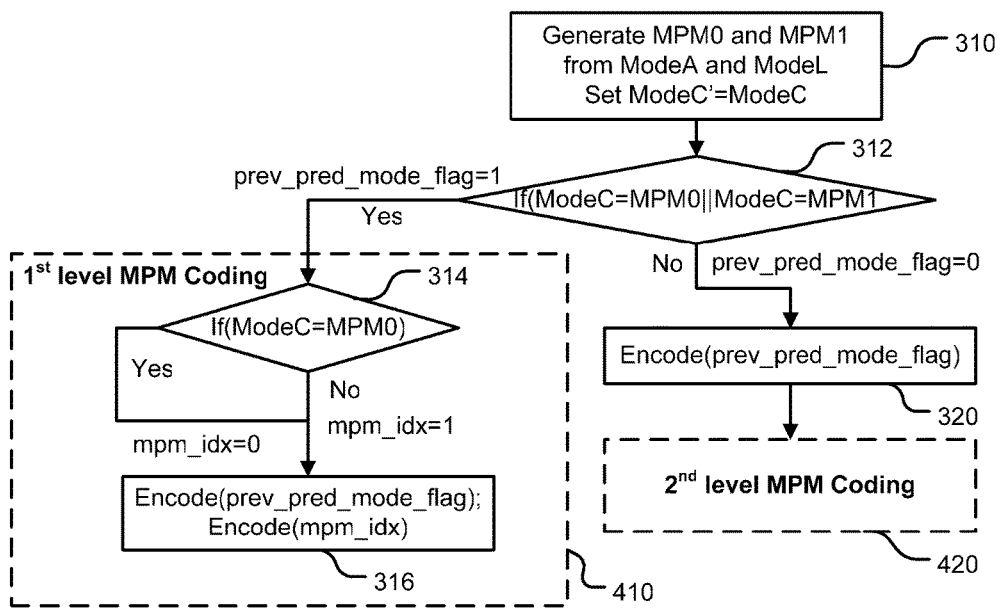
FIG. 4 illustrates an exemplary flow chart corresponding to coding intra prediction mode using two-level MPM sets according to an embodiment of the present invention.
Figure 5:
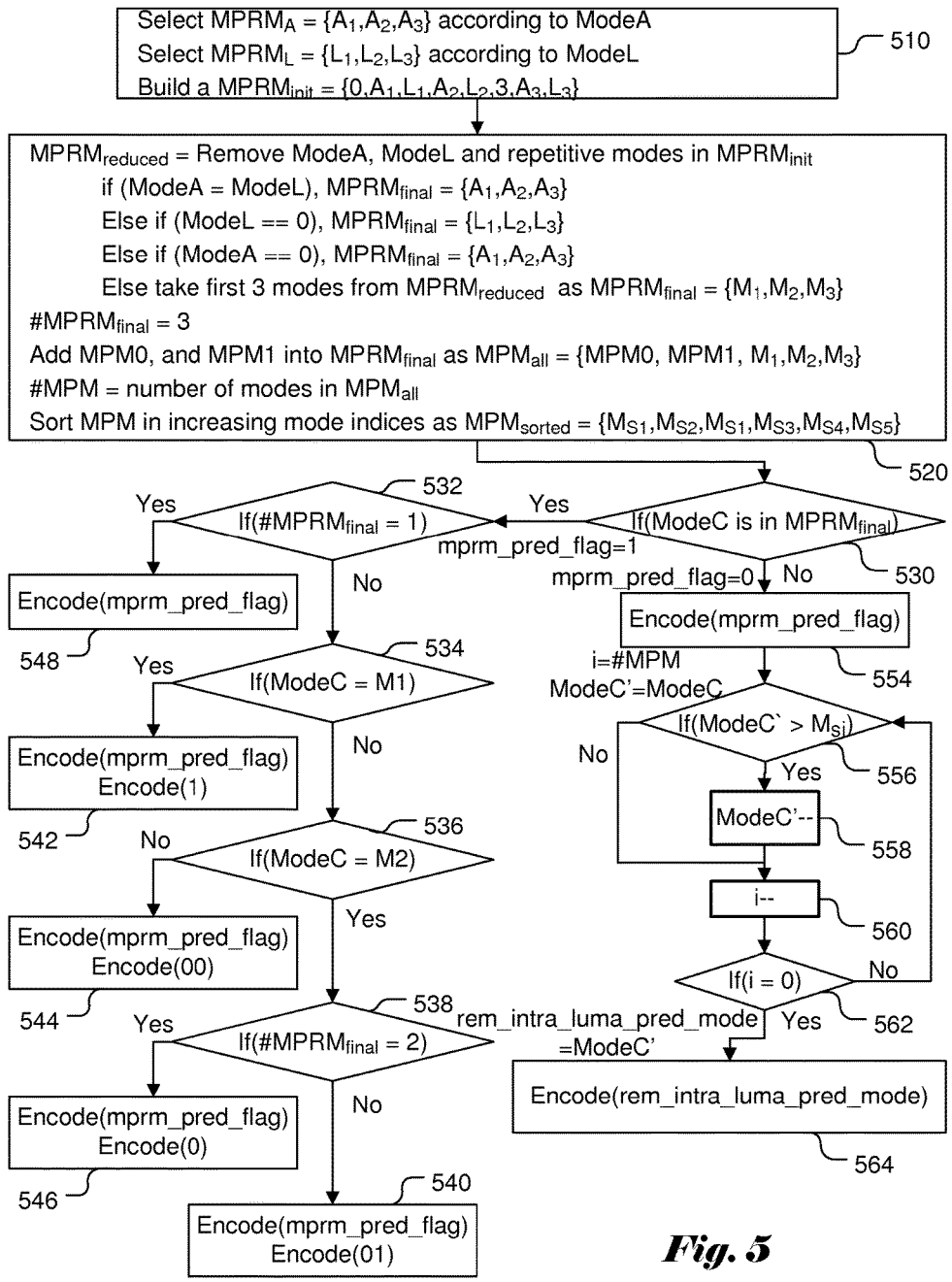
FIG. 5 illustrates an exemplary flow chart corresponding to coding intra prediction mode using the second-level MPM set according to an embodiment of the present invention.

FIG. 4 and FIG. 5 illustrate exemplary flow charts corresponding to two-level MPM coding according to an embodiment of the present invention. In the above example, the multi-level MPM coding classifies the MPMs into two levels. When the intra prediction mode of current PU (ModeC) is coded, the mode of the left PU (ModeL) and the mode of the above PU (ModeA) are used to generate the MPMs, i.e., MPM0 and MPM1, for ModeC. A test is performed in step 312 to determine whether ModeC is equal to MPM0 or MPM1. If the test result in step 312 is "Yes", prev_pred_mode_flag is set to 1 and the $1^{st}$ level MPM coding 410 is adopted. The $1^{st}$ level MPM coding shown in FIG. 4, is the same as HEVC Test Model Version 4.0 (HM-4.0) shown in FIG. 3. If test result in step 312 is "No", prev_pred_mode_flag is encoded with a value of 0 and the $2^{nd}$ level MPM coding 420 is adopted. The second level MPM coding is shown in FIG. 5.

In the $2^{nd}$ level MPM coding, three most probable remaining modes (MPRM) of ModeA $\{A_1, A_2, A_3\}$ and three MPRMs of ModeL $\{L_1, L_2, L_3\}$ are selected from predefined tables according to ModeA and ModeL. Table 4 illustrates MPRM table for 4×4 PU size and Table 5 illustrates the MPRM tables for PU sizes at 8×8, 16×16 and 32×32. These six modes are merged into an initial $MPRM_{init}$ list, $MPRM_{init}=\{0,A_1,L_1,A_2,L_2,3,A_3,L_3\}$, in an interleaving manner as shown in step 510. Then, redundant modes in the $MPRM_{init}$ list are removed, and modes equal to ModeA or ModeL are also removed as shown in step 520. After removal of redundant modes, the MPRM list is called $MPRM_{reduced}$. If ModeA is equal to ModeL, the $MPRM_{final}$ is equal to $\{A_1, A_2, A_3\}$. Otherwise if ModeL or Mode A is equal to 0, the $MPRM_{final}$ is equal to $\{A_1, A_2, A_3\}$ or $\{L_1, L_2, L_3\}$ respectively. Otherwise, the first three modes in $MPRM_{reduced}$ are extracted as $MPRM_{final}$.

After $MPRM_{final}$ is determined, ModeA and ModeL is added to $MPRM_{final}$ and the elements in $MPRM_{final}$ are sorted to form $MPM_{sorted}$. If ModeC is equal to one of the modes in $MPRM_{final}$, mprm_pred_flag is set to 1, and the index of MPRM is represented by a truncated unary code. If ModeC is not equal to any mode in $MPRM_{final}$, mprm_pred_flag is set to 0, and the rem_intra_luma_pred_mode is derived and coded in a way similar to that in HM-4.0. Steps 530 through 564 illustrate an example to derive rem_intra_luma_pred_mode. In step 530, a test regarding whether ModeC is in MPRM is performed. If the result is "Yes", the process goes to the branch (starting with step 532) to determine the member in MPRM$_{final}$ that is equal to ModeC. Otherwise, the process goes to the branch (starting from step 554 through step 564) to determine the member in the remaining prediction modes that is equal to ModeC. In the case that ModeC is in MPRM$_{final}$, mprm_pred_flag having a value of 1 is transmitted. A test regarding whether there is only one element in MPRM$_{final}$ is performed in step 532. If the test result is "Yes", there is no need to transmit any index associated with MPRM as shown in step 548. Otherwise, further process will be required to determine which member of MPRM$_{final}$ is equal to ModeC as shown in steps 534 through 546. The derivation of rem_intra_luma_pred_mode is similar to that in HM-4.0. If the ModeC is larger than n modes in MPMsorted, rem_intra_luma_pred_mode is equal to ModeC decreased by n.

TABLE 4

Most Probable Remaining Mode

| Mode | 1st MPRM | 2nd MPRM | 3rd MPRM |
| --- | --- | --- | --- |
| 0 | 1 | 2 | 9 |
| 1 | 12 | 13 | 2 |
| 2 | 17 | 16 | 1 |
| 3 | 1 | 2 | 9 |
| 4 | 15 | 11 | 3 |
| 5 | 11 | 12 | 1 |
| 6 | 13 | 14 | 1 |
| 7 | 14 | 10 | 3 |
| 8 | 16 | 15 | 2 |
| 9 | 10 | 17 | 2 |
| 10 | 7 | 9 | 3 |
| 11 | 4 | 5 | 15 |
| 12 | 5 | 1 | 13 |
| 13 | 1 | 6 | 12 |
| 14 | 6 | 7 | 3 |
| 15 | 8 | 4 | 11 |
| 16 | 2 | 8 | 17 |
| 17 | 9 | 2 | 16 |

TABLE 5

Most Probable Remaining Mode

| Mode | 1st MPRM | 2nd MPRM | 3rd MPRM |
| --- | --- | --- | --- |
| 0 | 1 | 2 | 32 |
| 1 | 22 | 23 | 2 |
| 2 | 31 | 30 | 1 |
| 3 | 1 | 2 | 32 |
| 4 | 27 | 19 | 3 |
| 5 | 20 | 21 | 12 |
| 6 | 24 | 25 | 13 |
| 7 | 26 | 10 | 3 |
| 8 | 29 | 28 | 16 |
| 9 | 33 | 32 | 17 |
| 10 | 7 | 34 | 3 |
| 11 | 19 | 20 | 4 |
| 12 | 21 | 22 | 1 |
| 13 | 23 | 24 | 1 |
| 14 | 25 | 26 | 7 |
| 15 | 28 | 27 | 4 |
| 16 | 30 | 29 | 2 |
| 17 | 32 | 31 | 2 |
| 18 | 34 | 33 | 10 |
| 19 | 4 | 11 | 20 |
| 20 | 11 | 5 | 19 |
| 21 | 5 | 12 | 22 |
| 22 | 12 | 1 | 23 |

TABLE 5-continued

Most Probable Remaining Mode

| Mode | 1st MPRM | 2nd MPRM | 3rd MPRM |
| --- | --- | --- | --- |
| 23 | 1 | 13 | 22 |
| 24 | 13 | 6 | 23 |
| 25 | 6 | 14 | 24 |
| 26 | 14 | 7 | 10 |
| 27 | 15 | 4 | 28 |
| 28 | 8 | 15 | 27 |
| 29 | 16 | 8 | 30 |
| 30 | 2 | 16 | 31 |
| 31 | 17 | 2 | 30 |
| 32 | 9 | 17 | 31 |
| 33 | 18 | 9 | 32 |
| 34 | 10 | 18 | 7 |

The exemplary Most Probable Remaining Mode (MPRM) tables in Table 4 and Table 5 select three modes as MPRMs for each given ModeA or ModeC. For example, if ModeA is 0, the three MPRMs selected are {1, 2, 9}. If ModeA is 1, the three MPRMs selected are {12, 13, 2} and so on. While 3 MPRMs are selected for each given ModeA or ModeC in Table 4 and Table 5, the particular number of MPRMs used should not be construed as a limitation to the present invention. A skilled person in the art may use other number of MPRMs for each given ModeA or ModeC and may also use different MPRMs tables from those in Table 4 and Table 5 to practice the present invention. Furthermore, the specific process of forming a $2^{nd}$ level MPM set as shown in steps 510 and 520 is intended as an illustration to derive a higher level ($2^{nd}$ level and above) MPM set. A skilled person in the art may practice the present invention by using other schemes to derive the higher level MPM set.

The n-bit fixed length binarization or coding is used to represent rem_intra_luma_pred_mode for the remaining modes in the $2^{nd}$ level MPM coding. The code word of rem_intra_luma_pred_mode is coded from the least significant bit (LSB). For example, a binary code word 10100 will be transmitted according to the order of "0", "0", "1", "0" and "1". The integer representation corresponding to the binary code word 10100 is 20 ($1*2^4+0*2^3+1*2^2+0*2^1+0*2^0=20$). In an embodiment of the present invention for rem_intra_luma_pred_mode coding, the codeword will be modified if the maximum remaining mode index is not equal to $2^n-1$. The intention is to shorten the first N codewords, where N equals to $2^n-1$ minus the maximum remaining mode index. The codewords of first N remaining mode indexes are the binarization results of remaining mode indexes represented in n−1 bits. The codewords of remaining mode indexes in the range of N to $2^{n-1}-1$ are the binarization results of remaining mode indexes represented in n bits. The codewords of the rest remaining mode indexes are the binarization results of remaining mode indexes plus N represented in n bits. It is noted that the coding of rest bits can be skipped if the following symbols in the fixed length coding can be derived from the transmitted bits. For example, Table 6 illustrates an example of binarized codeword for n=3 and the maximum remaining mode index is 5. Since n is equal to 3 and the maximum remaining mode index is 5, therefore N equals to 2($2^n-1-5=2$). In the above example, the first 2 codewords are 2 (i.e. n−1) bits and the rest codewords are 3 (i.e. n) bits. The remaining mode indexes larger than 3 (i.e. $2^{n-1}-1$) will be increased by 2 (i.e. N). In this example, if the first two decoded bins are "0 0", the remaining mode index should be 0, and the decoder does not have to decode the third bin.

TABLE 6

| Remaining mode index | Remapped index | Codeword |
|---|---|---|
| 0 | 0 | 00 |
| 1 | 1 | 01 |
| 2 | 2 | 010 |
| 3 | 3 | 011 |
| 4 | 6 | 110 |
| 5 | 7 | 111 |

Figure 6:
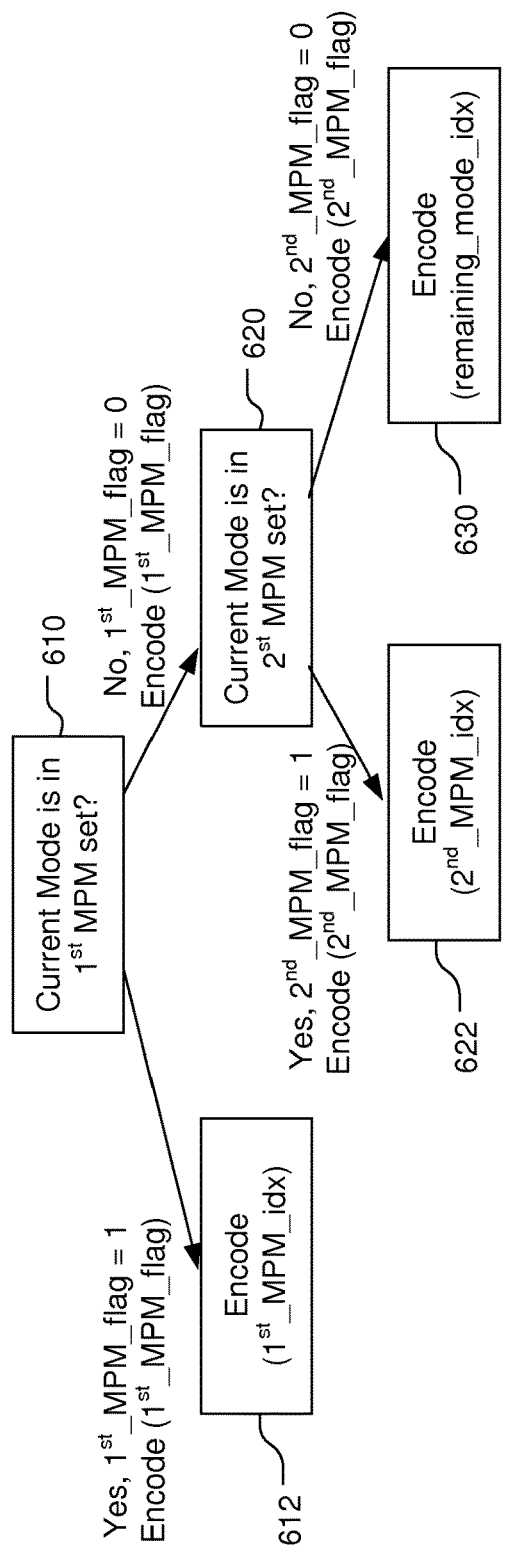
FIG. 6 illustrates an exemplary flow chart corresponding to coding intra prediction mode using two-level MPM sets according to an embodiment of the present invention.
Figure 7:
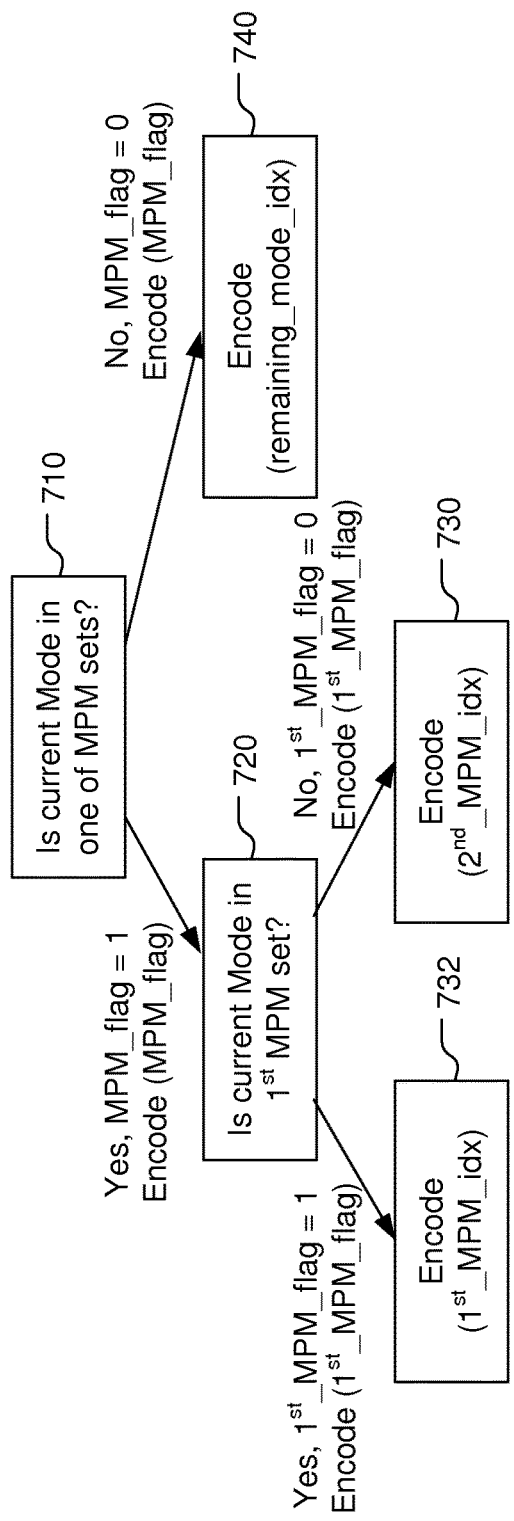
FIG. 7 illustrates another exemplary flow chart corresponding to coding intra prediction mode using two-level MPM sets according to an embodiment of the present invention.

FIG. 4 and FIG. 5 illustrate an example of 2-level MPM coding with detailed and specific implementation to form multiple-level MPM sets and to generate syntax information using the multiple-level MPM sets. An example of more general coding structure of a 2-level MPM coding according to embodiments of the present invention are shown in FIG. 6 and FIG. 7. In FIG. 6, the current intra prediction mode is first evaluated against the first-level MPM set in step 610. If the result is "Yes", a flag is transmitted to indicate this case (i.e., to indicate MPM_flag=1) and also an index $1^{st}$_MPM_idx is transmitted to identify the index as shown in step 612. If the current intra prediction mode is not in the first MPM set, the current intra prediction mode is then evaluated against the second-level MPM set as shown in step 620. Depending on the result of second evaluation, different actions 622 and 630 may be taken and result in different syntax information. The syntax information generated for the current intra prediction mode associated with step 622 and step 630 corresponds to coding result by first evaluating the intra prediction mode using the 2-level MPM sets in step 610 and then evaluating the intra prediction mode using the 2-level MPM sets in step 620. During the first evaluation in step 610, the intra prediction mode is evaluated using the first-level MPM set and during the second evaluation in step 620, the intra prediction mode is evaluated using the second-level MPM set.

FIG. 6 illustrates an example of evaluating the intra prediction mode using 2-level MPM sets, where the first-level MPM set is used in the first intra prediction mode evaluation and the second-level MPM set is used in the second intra prediction mode evaluation. Another embodiment of the present invention, shown in FIG. 7, uses an alternative usage of the multi-level MPM set during intra prediction mode evaluation. In step 710, the current intra prediction mode is evaluated using all levels of MPM sets, i.e., a test whether the current intra prediction mode is in any of the multi-level MPM sets is performed. If the result is "Yes", a second evaluation is performed using the first-level MPM set as shown in step 720. The syntax information generated for the current intra prediction mode associated with step 732 and step 730 corresponds to coding result by first evaluating the intra prediction mode using the 2-level MPM sets in step 710 and then evaluating the intra prediction mode using the 2-level MPM sets in step 720. On the other hand, the syntax information generated for the current intra prediction mode associated with step 740 corresponds to coding result of only one intra prediction mode evaluation in step 710.

Figure 8:
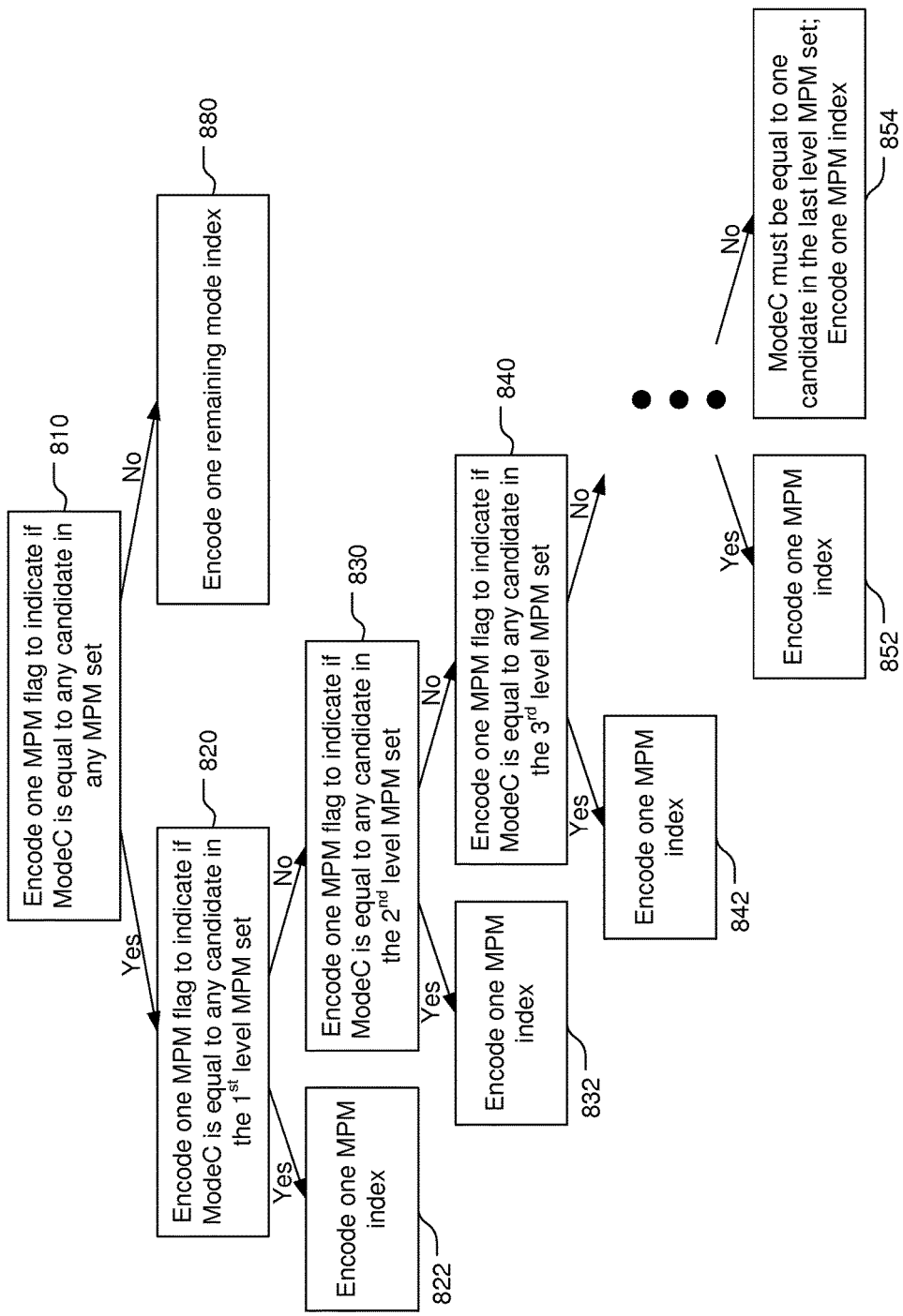
FIG. 8 illustrates an exemplary flow chart corresponding to encoding intra prediction mode using multi-level MPM sets according to an embodiment of the present invention.

FIG. 8 illustrates a flow chart for multi-level MPM coding according to an embodiment of the present invention. The MPMs are first organized into multi-level MPM sets. An MPM flag is transmitted to indicate whether ModeC is equal to any candidate in any MPM set as shown in step 810. If ModeC is equal to any candidate in any MPM set, the MPM flag is set and the coding process moves to step 820. Otherwise, the MPM flag is not set and one remaining mode index is encoded as shown in step 860. Furthermore, when ModeC is equal to any candidate in any MPM set, the coding process will determine which MPM set that ModeC belongs and determine the corresponding MPM index. For example, the 1st MPM set can be checked to see if ModeC is equal to any candidate in this set. If ModeC is equal to any candidate in this set, the corresponding MPM index is encoded. Otherwise, the next level MPM set is checked to see if ModeC is equal to any candidate in this set. If so, one MPM index is encoded and otherwise a further next-level MPM set is checked. If ModeC is not equal to any candidate of any next level MPM set, the coding process continues until the last level MPM set, where ModeC must be equal to one candidate in the last level MPM set. The successive next-level MPM set checking is illustrates by steps 820 through 854.

Figure 9:
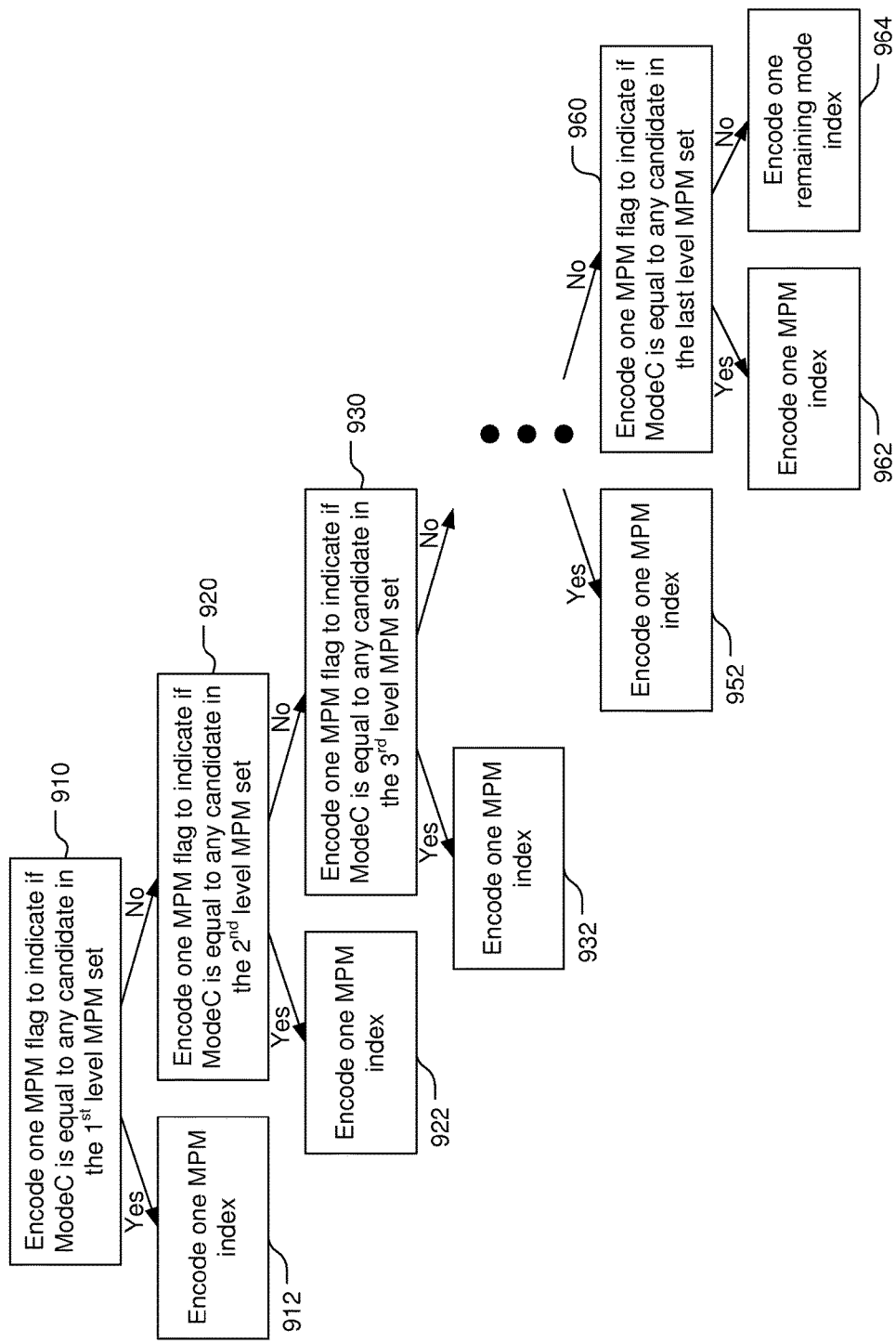
FIG. 9 illustrates another exemplary flow chart corresponding to encoding intra prediction mode using multi-level MPM sets according to an embodiment of the present invention.

While FIG. 8 illustrates one exemplary multi-level MPM coding process according to an embodiment of the present invention, a skilled person in the art may practice the invention using similar process without departing from the spirit of the present invention. For example, an alternative coding process as shown in FIG. 9 can be used to implement the multi-level MPM coding. Instead of checking whether ModeC is equal to any candidate in any MPM set as shown in step 810, the alternative coding process in FIG. 9 checks whether ModeC is equal to an MPM set successively as shown in steps 910 through 962. For example, whether ModeC is equal to any candidate in the $1^{st}$ level MPM set is checked in step 910. If the result is "Yes", the MPM flag having a value of 1 is transmitted, and furthermore, a corresponding MPM index is encoded in step 912. If ModeC is not equal to any candidate in the $1^{st}$ level MPM set, the MPM coding moves to the next level. If ModeC does not equal to any MPM set, ModeC is encoded using one remaining mode index as shown in step 964.

Figure 10:
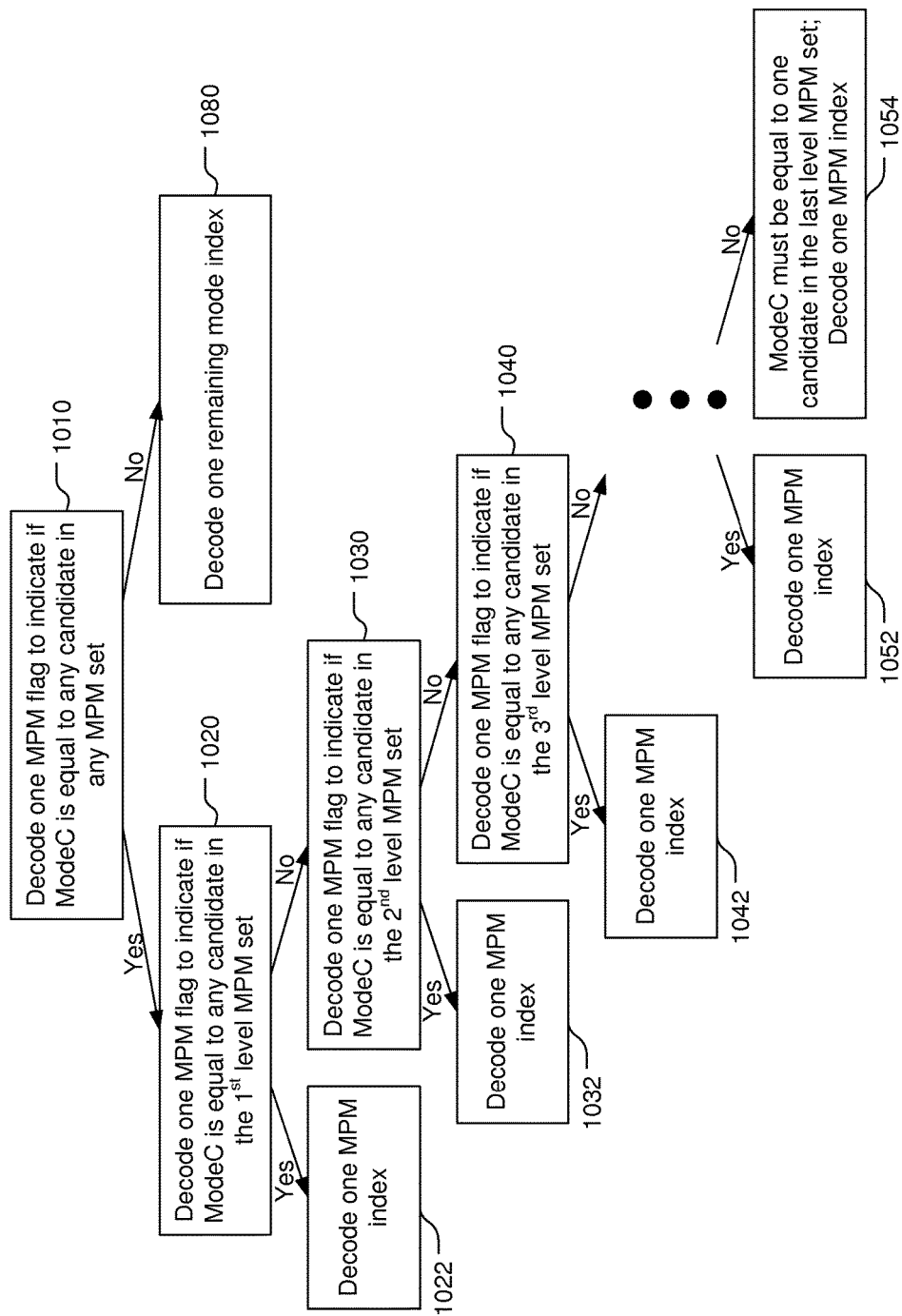
FIG. 10 illustrates an exemplary flow chart corresponding to decoding intra prediction mode using multi-level MPM sets according to an embodiment of the present invention.

FIG. 10 illustrates an exemplary decoder process according to an embodiment of the present invention for the encoder process of FIG. 8. In step 1010, the MPM flag is first decoded to determine whether ModeC is equal to any candidate in any MPM set. If the MPM flag is set, it indicates that ModeC is equal to a candidate in one of the MPM sets and, furthermore, steps 1020 through 1054 are used to determine the MPM index. If the MPM flag is not set, it indicates that ModeC is not equal to any candidate in any MPM set and the remaining mode index is decoded as shown in step 1080. In step 1020, an MPM flag is decoded to determine whether ModeC is equal to any candidate in the $1^{st}$ level MPM set. If the MPM flag indicates that ModeC is equal to a candidate in the $1^{st}$ level MPM set, an MPM index is decoded to identify which of the candidate in the $1^{st}$ level MPM set is equal to ModeC. If the MPM flag indicates that ModeC is not equal to any candidate in the current level MPM set, the MPM decoding process moves to the next level.

Figure 11:
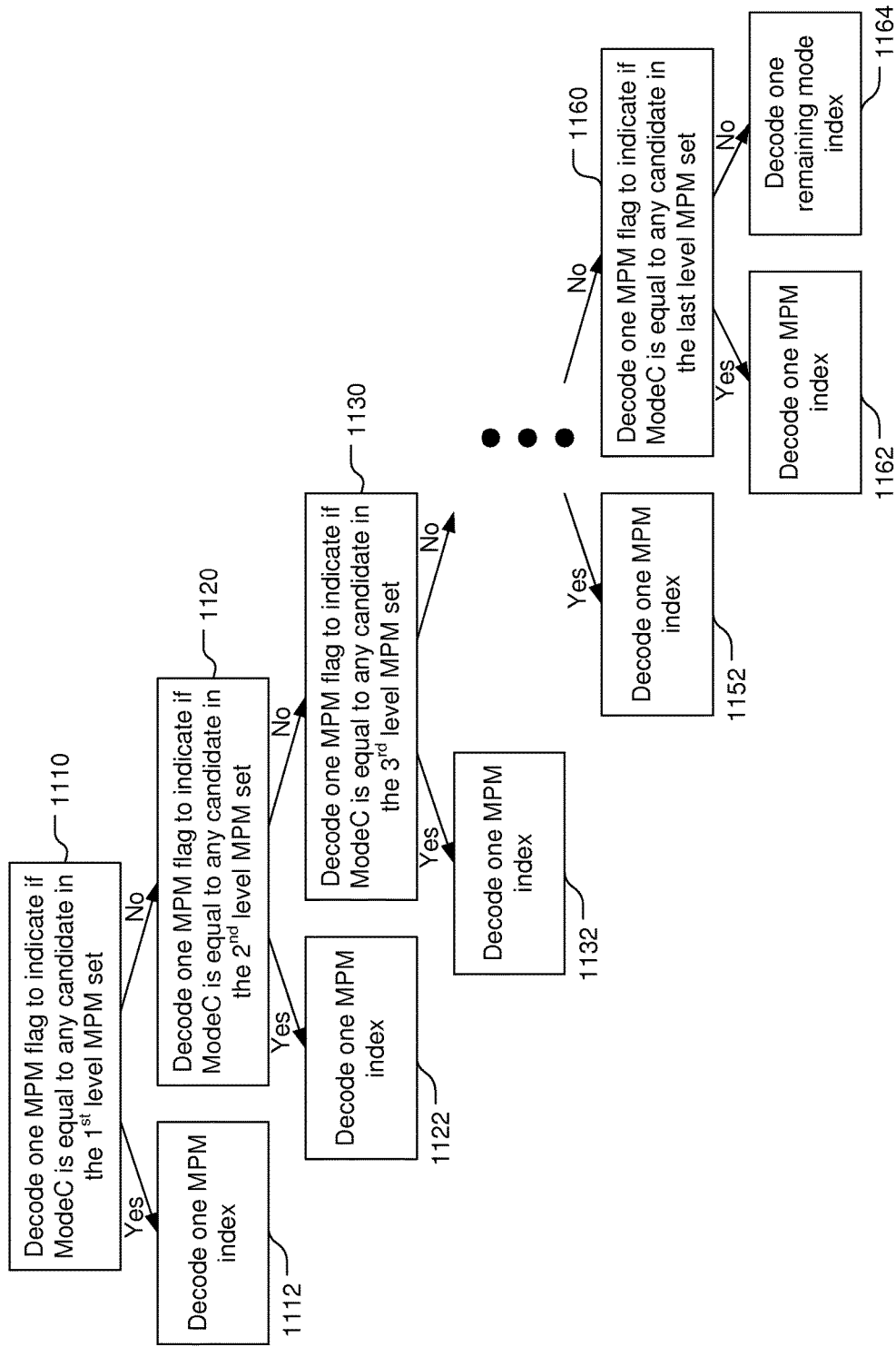
FIG. 11 illustrates another exemplary flow chart corresponding to decoding intra prediction mode using multi-level MPM sets according to an embodiment of the present invention.

FIG. 11 illustrates an alternative decoding process corresponding to the encoding process in FIG. 9. Instead of decoding an initial MPM flag that indicates whether ModeC is equal to any candidate in any MPM set as shown in step 1010, the alternative coding process in FIG. 11 decodes an MPM flag that indicates whether ModeC is equal to a candidate in one of the multi-level MPM sets successively as shown in steps 1110 through 1164. In step 1110, an MPM flag is decoded to determine whether ModeC is equal to any candidate in the $1^{st}$ level MPM set. If the MPM flag indicates that ModeC is equal to a candidate in the $1^{st}$ level MPM set, an MPM index is decoded to identify which of the candidate in the $1^{st}$ level MPM set is equal to ModeC as shown in step 1112. If the MPM flag indicates that ModeC is not equal to any candidate in the current level MPM set, the MPM decoding process moves to the next level as shown in step 1120. The decoding process is iterated until the last level.

For the last level decoding in step 1160, the MPM flag for the last level MPMP set is decoded. If the MPM flag indicates that ModeC is equal to one candidate in the last level MPM set, the decoding process decodes an MPM index to determine which candidate in the last level MPM set is equal to ModeC as shown in step 1162. Otherwise, the decoding process decodes a remaining mode index that indicates which of the remaining modes is equal to ModeC as shown in step 1164.

Figure 12:
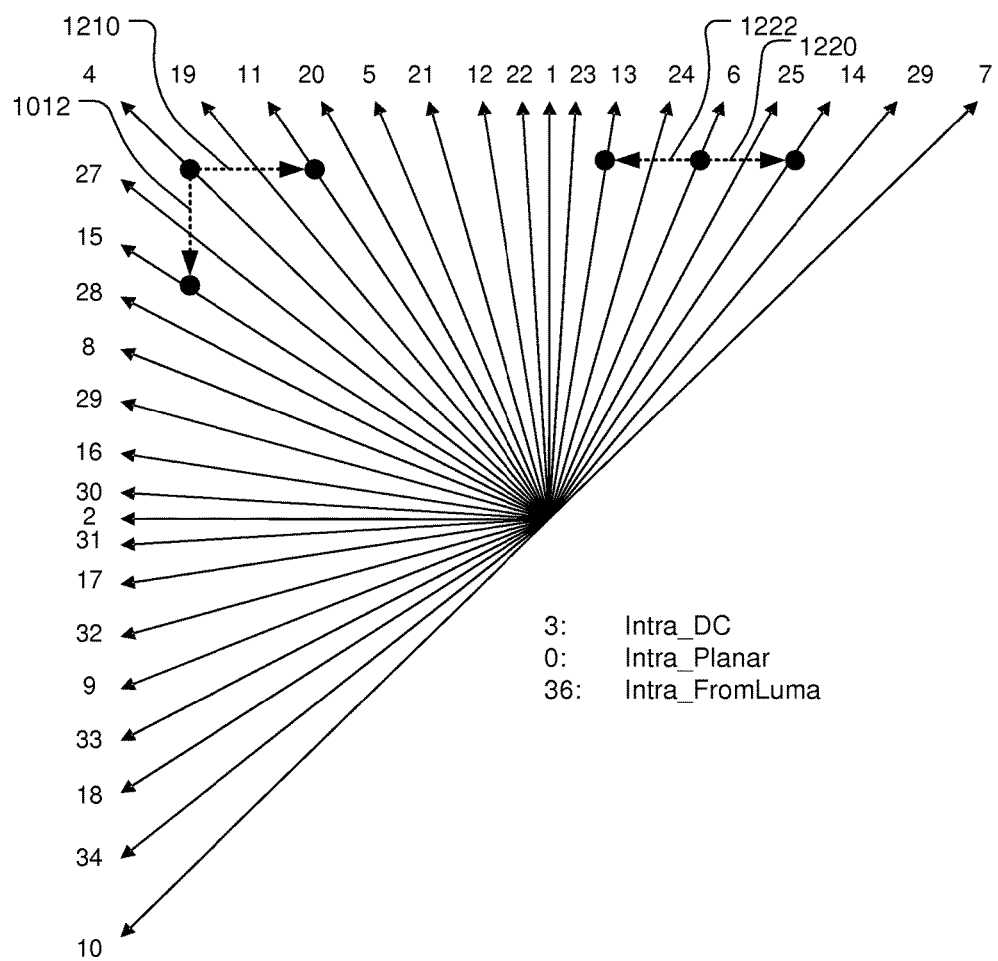
FIG. 12 illustrates an example of deriving chroma intra prediction modes for the intra prediction mode set from the Direct Mode.

For chroma intra prediction mode coding, information related to luma intra prediction may be used since the luma component usually is processed before corresponding chroma component. In an existing HEVC Test Model, Direct Mode (DM) is used as one of six modes for predicting the chroma intra prediction mode. When DM is chosen, the intra prediction mode derived from one or more adjacent luma blocks of a current block is used directly as the intra prediction mode for the chroma block. Embodiments according to the present invention also use other intra prediction modes around DM. The additional chroma intra prediction modes can be used to replace modes in the chroma intra prediction mode set. For example, the intra prediction mode corresponding to rotating DM clockwise by 2 positions (termed as DM+2 in this disclosure) can be used. Also, the intra prediction mode corresponding to rotating DM counter-clockwise by 2 positions (termed as DM-2 in this disclosure) can be used. FIG. 12 illustrates an example of DM+2 and DM-2 formation according to an embodiment of the present invention. For example, for IntraPredMode 4, DM+2 is formed by rotating IntraPredMode 4 clockwise as indicated by 1210. Accordingly, IntraPredMode 11 is selected as DM+2. Similarly, DM-2 is formed by rotating IntraPredMode 4 counter-clockwise as indicated by 1212 and IntraPredMode 15 is selected as DM-2. For IntraPredMode 6, DM+2 and DM-2 can be formed by rotating IntraPredMode 6 clockwise and counter-clockwise as indicated by 1220 and 1222 respectively. Accordingly, IntraPredMode 14 is selected as DM+2 and IntraPredMode 13 is selected as DM-2. The modes of DM+2 and DM-2 for all given IntraPredMode are shown in Table 7.

TABLE 7

| IntraPredMode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| DM + 2 | 1 | 13 | 16 | 1 | 11 | 12 | 14 | 14 | 15 | 17 | 18 | 5 | 1 | 6 | 7 | 4 | 8 | 2 |
| DM − 2 | 2 | 12 | 17 | 2 | 15 | 11 | 13 | 18 | 16 | 18 | 14 | 4 | 5 | 1 | 6 | 8 | 2 | 9 |

| IntraPredMode | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| DM + 2 | 9 | 20 | 21 | 22 | 23 | 24 | 25 | 26 | 7 | 19 | 27 | 28 | 29 | 30 | 31 | 32 | 33 |
| DM − 2 | 10 | 27 | 19 | 20 | 21 | 22 | 23 | 24 | 25 | 28 | 29 | 30 | 31 | 32 | 33 | 34 | 10 |

In one embodiment of the present invention, the two additional modes derived based on DM are added to the chroma intra prediction mode set. The additional modes derived based on DM can also be used to replace other intra prediction modes in the chroma intra prediction mode set. For example, the two additional modes can be used to replace Vertical and Horizontal modes in the conventional chroma intra prediction mode set in Table 2 and 3. An exemplary codeword table corresponding to the chroma intra prediction mode set embodying the present invention is shown in Table 8.

TABLE 8

| intra_chroma_pred_mode | Codeword |
|---|---|
| 0 (Planar) | 110 |
| DM + 2 | 1110 |
| DM − 2 | 11110 |
| 3 (DC) | 11111 |
| 35 (LM) | 10 |
| 36 (DM) | 0 |

For the exemplary codeword in Table 8, the codewords are the same as the conventional HEVC. However, the corresponding chroma intra prediction modes are different. A different codeword set may also be used to practice an embodiment of the present invention. Some tests have been conducted to compare the performance embodying the present invention using DM+2 and DM-2 modes in Table 8 and the performance of a convention HEVC using Table 3. The performance is measured in terms of BD-rate as shown in Table 9. The BD-rate is a well known performance measure used in the field of video coding. According to the tests, the system embodying the present invention using DM+2 and DM-2 modes in Table 8 is 0.3% better in terms of RD-rate than the conventional HEVC using Table 3 for regular Intra configuration. The system embodying the present invention using DM+2 and DM-2 modes in Table 8 is 0.4% better in terms of RD-rate than the conventional HEVC using Table 3 for Low-Complexity (LoCo) Intra configuration. A very modest increase in encoding time (1%) is noticed for the regular Intra configuration.

TABLE 9

| | Intra | | | Intra LoCo | | |
|---|---|---|---|---|---|---|
| | Y BD-rate | U BD-rate | V BD-rate | Y BD-rate | U BD-rate | V BD-rate |
| Class A | 0.0 | −0.1 | −0.1 | 0.0 | −0.2 | −0.1 |
| Class B | 0.0 | −0.3 | −0.3 | 0.0 | −0.3 | −0.4 |
| Class C | 0.0 | −0.4 | −0.4 | 0.0 | −0.5 | −0.5 |
| Class D | 0.0 | −0.4 | −0.3 | 0.0 | −0.4 | −0.5 |
| Class E | 0.0 | −0.3 | −0.4 | 0.0 | −0.9 | −0.6 |
| All | 0.0 | −0.3 | −0.3 | 0.0 | −0.4 | −0.4 |
| Enc Time[%] | | 101% | | | 100% | |
| Dec Time[%] | | 100% | | | 100% | |

While Table 8 illustrates one example of codeword table according to an embodiment of the present invention, other codeword tables may also be used. Table 10 illustrates another codeword table according to an embodiment of the present invention. The codeword table in Table 10 assigns codewords to DM+2 and DM-2 shorter than the codeword to Planar mode.

TABLE 10

| intra_chroma_pred_mode | Codeword |
|---|---|
| DM + 2 | 110 |
| DM − 2 | 1110 |
| 0 (Planar) | 11110 |
| 3 (DC) | 11111 |
| 35 (LM) | 10 |
| 36 (DM) | 0 |

While the codeword set in Tables 8 and 10 are the same as the codeword set of conventional HEVC in Table 3, other codeword sets may also be used to practice the present invention. For example, Table 11 illustrates an alternative codeword set according to an embodiment of the present invention. In Table 11, the codewords for DM+2, DM-2, Planar mode and DC mode are fixed length with 4 bits each. Based on tests as shown in Table 12, the chroma intra prediction mode coding using Table 11 achieves better BD-rate performance than the chroma intra prediction mode coding using Table 8.

TABLE 11

| intra_chroma_pred_mode | Codeword |
|---|---|
| DM + 2 | 1100 |
| DM − 2 | 1101 |
| 0 (Planar) | 1110 |
| 3 (DC) | 1111 |
| 35 (LM) | 10 |
| 36 (DM) | 0 |

TABLE 12

| | Intra | | | Intra LoCo | | |
|---|---|---|---|---|---|---|
| | Y BD-rate | U BD-rate | V BD-rate | Y BD-rate | U BD-rate | V BD-rate |
| Class A | 0.0 | −0.2 | −0.1 | 0.0 | −0.3 | −0.3 |
| Class B | 0.0 | −0.4 | −0.2 | 0.0 | −0.4 | −0.5 |
| Class C | 0.0 | −0.5 | −0.6 | 0.0 | −0.6 | −0.7 |
| Class D | 0.1 | −0.4 | −0.5 | 0.0 | −0.6 | −0.5 |
| Class E | 0.0 | −0.3 | −0.4 | 0.1 | −0.8 | −0.7 |
| All | 0.0 | −0.4 | −0.3 | 0.0 | −0.5 | −0.5 |
| Enc Time[%] | | 101% | | | 101% | |
| Dec Time[%] | | 100% | | | 100% | |

The additional intra prediction modes derived from DM may also be added to the intra prediction mode set instead of replacing other existing modes in the intra prediction mode set to practice the present invention. For example, Table 13 illustrates an example to add DM+2 and DM-2 to an existing chroma intra prediction mode set. Accordingly, the total number of intra prediction modes is increased from 6 to 8. The performance corresponding to Table 13 is shown in Table 14, where similar performance improvement is noticed.

TABLE 13

| intra_chroma_pred_mode | Codeword |
|---|---|
| 0 (Planar) | 110 |
| DM + 2 | 1110 |
| DM − 2 | 11110 |
| 3 (DC) | 111110 |
| 1 (Vertical) | 1111110 |
| 2 (Horizontal) | 1111111 |
| 35 (LM) | 10 |
| 36 (DM) | 0 |

TABLE 14

| | Intra | | | Intra LoCo | | |
|---|---|---|---|---|---|---|
| | Y BD-rate | U BD-rate | V BD-rate | Y BD-rate | U BD-rate | V BD-rate |
| Class A | 0.0 | −0.2 | 0.0 | 0.0 | −0.3 | −0.1 |
| Class B | 0.0 | −0.3 | −0.2 | 0.0 | −0.3 | −0.4 |
| Class C | 0.0 | −0.4 | −0.5 | 0.0 | −0.5 | −0.5 |
| Class D | 0.0 | −0.5 | −0.5 | 0.0 | −0.5 | −0.6 |
| Class E | 0.0 | −0.4 | −0.6 | 0.1 | −0.5 | −0.7 |
| All | 0.0 | −0.4 | −0.4 | 0.0 | −0.4 | −0.5 |
| Enc Time[%] | | 103% | | | 104% | |
| Dec Time[%] | | 99% | | | 100% | |

As yet another example, a chroma intra prediction codeword table is used, where the table consists of 6 entries including DM, LM and four other modes. The codewords, i.e., 1100, 1101, 1110, 1111, 10 and 0, adopted are the same as these in Table 11. However, the four fixed-length codewords correspond to the four other than DM/LM modes. Variable-length codewords 10 and 0 are used for the DM and LM respectively.

TABLE 15

| Mode Index | Codeword |
|---|---|
| Mode other than DM/LM | 1100 |
| Mode other than DM/LM | 1101 |
| Mode other than DM/LM | 1110 |
| Mode other than DM/LM | 1111 |
| DM | 10 |
| LM | 0 |

The above description is presented to enable a person of ordinary skill in the art to practice the present invention as provided in the context of a particular application and its requirements. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced Embodiment of video systems incorporating encoding or decoding of multi-level intra luma prediction mode according to the present invention as described above may be implemented in various hardware, software codes, or a combination of both. For example, an embodiment of the present invention can be a circuit integrated into a video compression chip or program codes integrated into video compression software to perform the processing described herein. An embodiment of the present invention may also be program codes to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware codes may be developed in different programming languages and different format or style. The software code may also be compiled for different target platform. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method for intra prediction mode decoding based on multi-level most probable mode (MPM) sets comprising a first-level MPM set and second-level MPM set, the method comprising:
   determining a plurality of MPM candidates for the first-level MPM set, wherein determining the plurality of MPM candidates comprises:
   identifying a first MPM candidate based on a mode of a first block; and
   identifying a second MPM candidate based on a mode of a second block;
   determining a plurality of most probable remaining mode (MPRM) candidates for the second-level MPM set, wherein determining the plurality of MPRM candidates comprises:
   identifying a first MPRM candidate and a second MPRM candidate where the first MPRM candidate and the second MPRM candidate are different from any MPM candidate in the first-level MPM set; and
   decoding syntax information related to a current intra prediction mode corresponding to a third block according to the multi-level MPM sets using a decoder, wherein one syntax element of the syntax information to be decoded is associated with a first MPM flag, wherein decoding the syntax information comprises:
   determining the current intra prediction mode using the multi-level MPM sets and the first MPM flag; and
   decoding the third block based on the determined current intra prediction mode.

2. The method of claim 1, further comprising removing redundant candidates in the multi-level MPM sets.

3. The method of claim 1, wherein DC mode and Planar mode have different mode indices in at least one of the multi-level MPM sets.

4. The method of claim 1, wherein the first MPM flag indicates whether the current intra prediction mode is equal to any candidate in the multi-level MPM sets.

5. The method of claim 1, wherein a remaining mode index is decoded if the first MPM flag indicates that the current intra prediction mode is not equal to any candidate in the multi-level MPM sets.

6. The method of claim 5, wherein if a portion of remaining mode index bins or bits can be derived from already decoded bins or bits of the remaining mode index, the portion is skipped without parsing.

7. The method of claim 4, wherein the syntax information includes a second MPM flag to indicate whether the current intra prediction mode is equal to any candidate in the first-level MPM set.

8. The method of claim 7, wherein if the second MPM flag indicates that the current intra prediction mode is equal to one candidate in the first-level MPM set, decoding syntax information associated with MPM flags is stopped, otherwise, decoding syntax information associated with a third MPM flag to indicate whether the current intra prediction mode is equal to one candidate in the second-level MPM set is performed.

9. The method of claim 1, wherein the syntax information includes an MPM index to indicate which of the plurality of MPM candidates in the first-level MPM set is equal to the current intra prediction mode.

10. The method of claim 9, wherein decoding the syntax information corresponding to the MPM index is skipped if the first-level MPM set includes only one MPM candidate.

11. The method of claim 1, wherein modes equal to the first MPM candidate or the second MPM candidate are removed from the plurality of MPRM candidates.

12. The method of claim 1, wherein the first MPM flag indicates whether the current intra prediction mode is equal to any MPM candidate in the first-level MPM set.

13. The method of claim 12, wherein, if the first MPM flag indicates that the current intra prediction mode is equal to one candidate in the first-level MPM set, decoding syntax information associated with MPM flags is stopped, otherwise, decoding syntax information associated with a second MPM flag to indicate whether the current intra prediction mode is equal to a candidate in the second-level MPM set is performed.

14. The method of claim 13, wherein the syntax information includes an MPM index to indicate which of the candidates in one MPM set of the multi-level MPM sets is equal to the current intra prediction mode.

15. The method of claim 14, wherein said decoding the syntax information corresponding to the MPM index is skipped if the one MPM set includes only one MPM candidate.

16. The method of claim 13, wherein the syntax information includes an index of remaining mode if the second MPM flag indicates that the current intra prediction mode does not exist in the second-level MPM set of the multi-level MPM sets.

17. The method of claim 16, wherein if a portion of remaining mode index bins or bits can be derived from already decoded bins or bits of the remaining mode index, the portion is skipped without parsing.

18. A method for intra prediction mode coding using multi-level most probable mode (MPM) sets comprising a first-level MPM set and a second-level MPM set, the method comprising:
   receiving a current intra prediction mode corresponding to a first block;
   determining a plurality of MPM candidates for the first-level MPM set, wherein determining the plurality of MPM candidates comprises:

identifying a first MPM candidate based on a mode of a second block; and identifying a second MPM candidate based on a mode of a third block;

determining a plurality of most probable remaining mode (MPRM) candidates for the second-level MPM set, wherein determining the plurality of MPRM candidates comprises:

identifying a first MPRM candidate and a second MPRM candidate where the first MPRM candidate and the second MPRM candidate are different from any MPM candidate in the first-level MPM set; and encoding the current intra prediction mode according to the multi-level MPM sets to generate syntax information using an encoder, wherein one syntax element of the syntax information generated is associated with a MPM flag, wherein encoding the current intra prediction mode comprises:

setting the MPM flag responsive to the current intra prediction mode being equal to one candidate in the multi-level MPM sets; and encoding the first block based on the current intra prediction mode.

19. The method of claim 18, further comprising removing redundant candidates from the multi-level MPM sets.

20. The method of claim 18, wherein DC mode and Planar mode have different mode indices in at least one of the multi-level MPM sets.

21. The method of claim 18, wherein the MPM flag indicates whether the current intra prediction mode is equal to any candidate in the multi-level MPM sets.

22. The method of claim 18, wherein modes equal to the first MPM candidate or the second MPM candidate are removed from the plurality of MPRM candidates.

23. The method of claim 1, wherein an index of the plurality of MPRM candidates is represented by a truncated unary code.

24. The method of claim 18, wherein an index of the plurality of MPRM candidates is represented by a truncated unary code.

25. The method of claim 18, wherein the MPM flag indicates whether the current intra prediction mode is equal to any candidate in the first-level MPM set.

* * * * *